H. H. B. VINCENT.
Broom Head.
No. 60,291.
Patented Dec. 4, 1866.
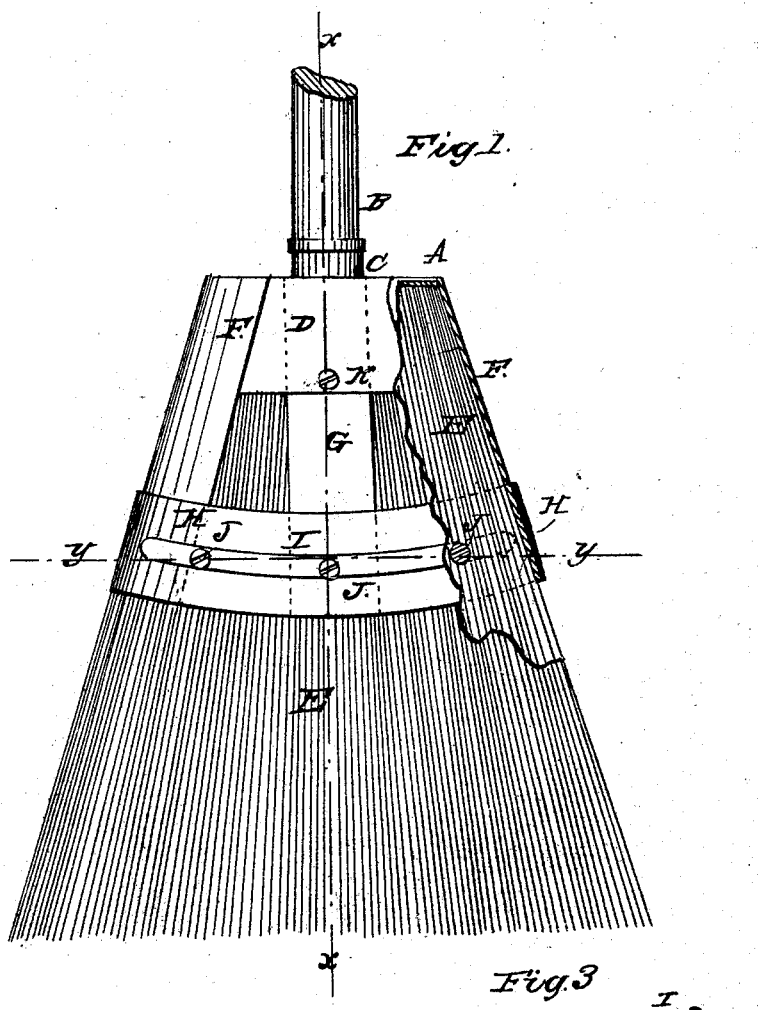
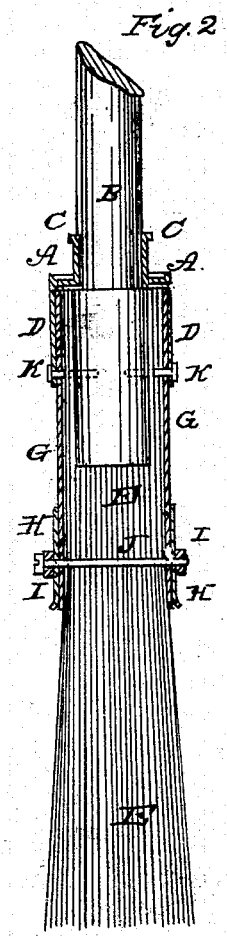
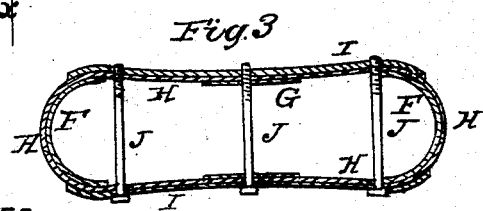
WITNESSES
INVENTOR

United States Patent Office.

IMPROVED BROOM-HEAD.

H. H. B. VINCENT, OF OSHKOSH, WISCONSIN.

Letters Patent No. 60,291, dated December 4, 1866.

SPECIFICATION.

TO ALL WHOM IT MAY CONCERN:

Be it known that I, HENRY H. B. VINCENT, of Oshkosh, in the county of Winnebago, and State of Wisconsin, have invented a new and useful improvement in Brooms; and I do hereby declare that the following is a full, clear, and exact description thereof, which will enable others skilled in the art to make and use the same, reference being had to the accompanying drawing, forming part of this specification, in which—

Figure 1 is a side view of my improved broom, part being broken away to show the construction.

Figure 2 is a longitudinal section of the same, taken through the line $x\ x$, fig. 1.

Figure 3 is a cross-section of the same, taken through the line $y\ y$, fig. 1, the corn being omitted.

My invention has for its object to furnish a firm and substantial broom, and one that can readily be refilled when desired; and it consists, first, in a broom-head formed with downwardly projecting side and edge arms; second, in the combination of a sliding band with the arms of the broom-head; third, in the combination of the binding bars with the sliding band, and with the arms of the broom-head, as hereinafter more fully described.

The top or upper part, A, of the broom-head is made flat, as shown in the drawings, and has a hole made through its central part for the passage of the handle, B; into this hole is fitted a short tube, C, both for the sake of preventing the sharp edge of the plate, A, from wearing the handle, and also to furnish a firmer bearing for the handle. To the side edge of the plate, A, are attached side plates, D, forming the sides of the broom-head. These plates, D, extend down far enough to receive and contain the upper ends of the corn, E. To the end edges of the plates, A, and to the side plates, D, are attached the edge plates or arms, F. These plates or arms, F, are curved, as shown, so as to pass round the edges of the broom, and they extend down as far as it is necessary that the corn should be supported to make a firm broom. The side arms, G, are made in one piece, which passes over the top of the broom inside of the plates, A and D, and has a hole pierced through it for the passage of the handle, B, as shown in fig. 2. H is a sliding band, which passes around the broom at the lower ends of the arms, F and G, as shown in the drawings, and which confines the corn in proper shape, giving strength and firmness to the broom. The lower edges of this band, H, are slightly turned outward, so as to prevent its edge from cutting the corn. Both the lower and upper edges of the band, H, are made circular, as shown in fig. 1, which gives a neater appearance to the broom. The broom is further stiffened by the binding bars, I, which have the same curve as the edges of the band, H, and are placed on each side of the broom about the middle of the band, H, as shown in figs. 1, 2, and 3. The binding bars I, sliding band H, and arms G are secured to each other, clamping the corn firmly to its place by bolts, J, passing through the broom and screwing into one of the bars, I. Upon the projecting ends of these screw-bolts, J, may be placed nuts to prevent said projecting ends from catching upon and tearing articles of clothing with which they may come in contact while the broom is being used. The lower end of the handle, B, is made larger than the upper end, and has a shoulder formed upon it, as shown in fig. 2. This shoulder rests against the under side of the top plates, and thus gives greater strength to the broom. The handle, B, is inserted from the lower side of the broom-head, and is secured in place by screws, K, passing through the sides of the broom-head and into the lower end of the handle, as shown in fig. 2.

In filling the broom-head, the bolts, J, and binding bars, I, are removed and the band, H, slipped up; this allows the corn to be readily inserted in its place. The band, H, is then slid back to its place, the bars, I, and bolts, J, attached, and the broom is complete.

What I claim as new, and desire to secure by Letters Patent, is—

I claim the combination of the projecting side and edge arms with the sliding band H, and binding rods I, all substantially as and for the purpose set forth.

The above specification of my invention, signed by me this 14th day of February, 1866.

HENRY H. B. VINCENT.

Witnesses:
H. B. JACKSON,
R. McCURDY.